United States Patent
Thapliya et al.

(10) Patent No.: US 9,729,417 B2
(45) Date of Patent: Aug. 8, 2017

(54) COMMUNICATION-INFORMATION MEASURING DEVICE AND NON-TRANSITORY COMPUTER READABLE MEDIUM

(71) Applicant: FUJI XEROX CO., LTD., Tokyo (JP)

(72) Inventors: Roshan Thapliya, Kanagawa (JP); Chaoxin Hu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 126 days.

(21) Appl. No.: 14/737,018

(22) Filed: Jun. 11, 2015

(65) Prior Publication Data

US 2015/0281026 A1    Oct. 1, 2015

Related U.S. Application Data

(63) Continuation of application No. PCT/JP2013/073853, filed on Sep. 4, 2013.

(30) Foreign Application Priority Data

Feb. 22, 2013  (JP) ................................ 2013-033237

(51) Int. Cl.
*H04L 12/26* (2006.01)
*H04L 29/14* (2006.01)
(Continued)

(52) U.S. Cl.
CPC ........ *H04L 43/0841* (2013.01); *H04L 1/1657* (2013.01); *H04L 1/1832* (2013.01);
(Continued)

(58) Field of Classification Search
CPC ... H04L 43/0841; H04L 1/1657; H04L 1/832; H04L 1/203; H04L 1/205; H04L 43/0835;
(Continued)

(56) References Cited

U.S. PATENT DOCUMENTS

2002/0176361 A1*  11/2002  Wu ................... H04L 29/06027
                                                              370/231
2003/0023746 A1*   1/2003  Loguinov ............... H04L 47/10
                                                              709/235
(Continued)

FOREIGN PATENT DOCUMENTS

JP           2007504694 A        3/2007

OTHER PUBLICATIONS

Nov. 26, 2013 International Search Report issued in International Application No. PCT/JP2013/073853.

*Primary Examiner* — Ajay Cattungal
(74) *Attorney, Agent, or Firm* — Oliff PLC (57) ABSTRACT

An information terminal sequentially transmits one or more packets to an information distribution server, receives acknowledgments for the transmitted packets from the information distribution server, and records a round trip time and occurrence of packet loss for each of the transmitted packets. Among one or more packet sequences, the information terminal counts the number of packet sequences which are such that the number of packet losses included in each of the packet sequences and an increase state of the round trip time for packets included in the packet sequence satisfy respective predetermined conditions. Each of the one or more packet sequences has multiple continuous packets including one or more packets, for which packet loss is recorded among the transmitted packets, at the top. The information terminal calculates a packet loss ratio on the basis of the counted number and the number of transmitted packets.

8 Claims, 7 Drawing Sheets

(51) Int. Cl.
   *H04L 1/16*      (2006.01)
   *H04L 1/18*      (2006.01)
   *H04L 1/20*      (2006.01)
   *H04W 80/00*     (2009.01)

(52) U.S. Cl.
   CPC ............. *H04L 1/203* (2013.01); *H04L 1/205* (2013.01); *H04L 43/0835* (2013.01); *H04L 43/0864* (2013.01); *H04L 69/40* (2013.01); *H04L 43/10* (2013.01); *H04W 80/00* (2013.01)

(58) Field of Classification Search
   CPC ..... H04L 43/0864; H04L 69/40; H04L 43/10; H04W 80/00
   See application file for complete search history.

(56) References Cited

U.S. PATENT DOCUMENTS

| | | | | |
|---|---|---|---|---|
| 2003/0152034 | A1* | 8/2003 | Zhang | H04L 29/12509 370/252 |
| 2006/0224763 | A1* | 10/2006 | Altunbasak | H04L 69/14 709/231 |
| 2006/0227708 | A1* | 10/2006 | Tan | H04L 1/187 370/235 |
| 2007/0121639 | A1* | 5/2007 | Degrande | H04L 1/004 370/394 |
| 2007/0165524 | A1 | 7/2007 | Mascolo | |
| 2013/0019025 | A1* | 1/2013 | Chaturvedi | H04L 29/06517 709/231 |
| 2013/0159806 | A1* | 6/2013 | Okuno | H04L 1/18 714/749 |
| 2013/0227371 | A1* | 8/2013 | Asterjadhi | H04L 1/1614 714/748 |

\* cited by examiner

COMMUNICATION-INFORMATION MEASURING DEVICE AND NON-TRANSITORY COMPUTER READABLE MEDIUM

CROSS REFERENCE TO RELATED APPLICATION

This is a continuation of International Application No. PCT/JP2013/073853 filed on Sep. 4, 2013, and claims priority from Japanese Patent Application No. 2013-033237, filed on Feb. 22, 2013.

BACKGROUND

1. Technical Field

The present invention relates to a communication-information measuring device and a non-transitory computer readable medium.

2. Related Art

To measure actual communication performance between communication apparatuses connected with each other via a communication network, the bandwidth between the communication apparatuses may be measured.

When wired communication is performed, occurrence of packet loss is mainly caused by communication congestion. When wireless communication is performed, occurrence of packet loss is caused by radio noise as well as communication congestion. Therefore, when the bandwidth is calculated by substituting a packet loss rate calculated in wireless communication into an expression for computation, without conversion, which is similar to that for wired communication, the calculated bandwidth may be inaccurate.

SUMMARY

An aspect of the present invention provides a communication-information measuring device comprising: a transmitting unit that sequentially transmits one or more packets to a communication target apparatus; a receiving unit that receives acknowledgments for the transmitted packets from the communication target apparatus; a recording unit that records a round trip time and occurrence of packet loss for each of the transmitted packets on the basis of the transmitted packet and the acknowledgment for the transmitted packet; a counting unit that counts the number of packet sequences among one or more packet sequences, each of the one or more packet sequences having a plurality of continuous packets including one or more packets at the top, each of the one or more packets being a packet for which packet loss is recorded by the recording unit among the transmitted packets, each of the packet sequences being such that the number of packet losses included in the packet sequence and an increase state of the round trip time for packets included in the packet sequence satisfy respective predetermined conditions; and a calculating unit that calculates a packet loss ratio on the basis of the number counted by the counting unit and the number of transmitted packets.

BRIEF DESCRIPTION OF THE DRAWINGS

Exemplary embodiment(s) of the present invention will be described in detail based on the following figures, wherein.

DETAILED DESCRIPTION

An embodiment for carrying out the present invention (hereinafter referred to as an embodiment) will be described with reference to the drawings.

1. System Configuration Diagram

Figure 1:
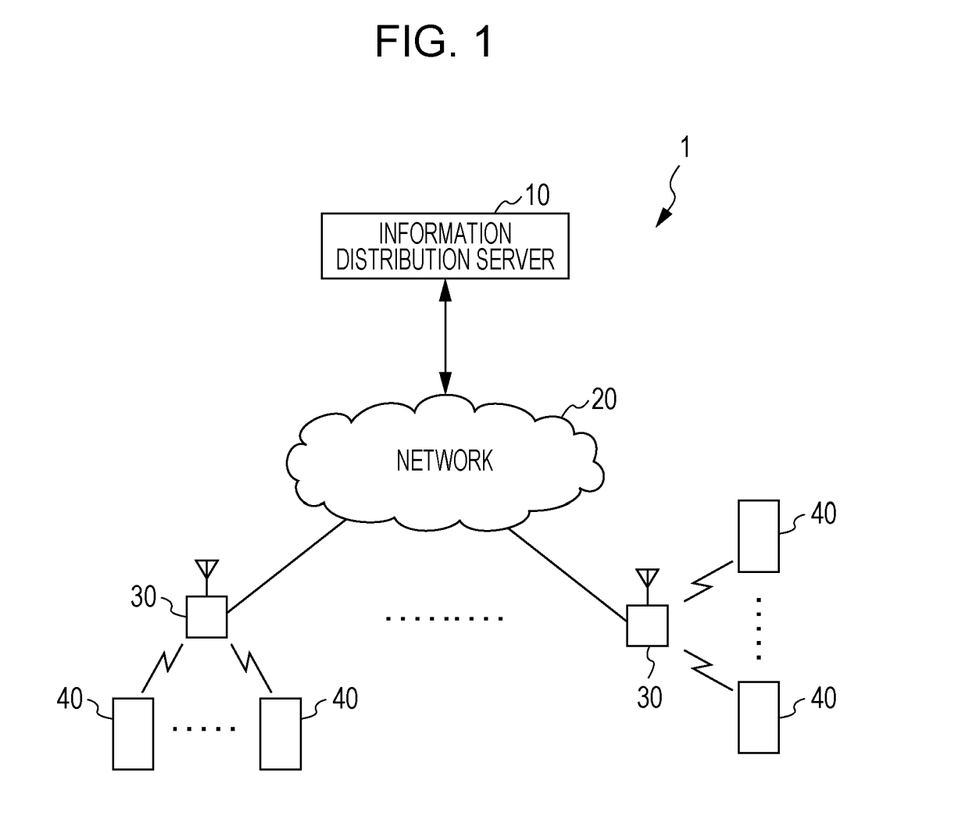
FIG. 1 is a diagram illustrating the system configuration of an information distribution system according to the present embodiment.

FIG. 1 is a diagram illustrating the system configuration of an information distribution system 1 according to the present embodiment. As illustrated in FIG. 1, the information distribution system 1 includes an information distribution server 10, one or more base station apparatuses 30, and one or more information terminals 40. The information distribution server 10 communicates with each of the base station apparatuses 30, for example, via a network 20 such as an optical communication network. The information distribution server 10 may communicate with each of the information terminals 40 by performing wireless communication, such as mobile communication or wireless LAN communication, between the information terminal 40 and a base station apparatus 30. In the present embodiment, an information terminal 40 uses wireless communication to communicate with the information distribution server 10. Alternatively, an information terminal 40 may use wired communication to communicate with the information distribution server 10.

The information distribution server 10 is a computer which stores data, such as web pages and movies, and which provides the data in response to a request from an information terminal 40. The information distribution server 10 may select the quality (such as the resolution or the size) of data (movie) according to the request from the information terminal 40 on the basis of the communication bandwidth (BW) between the information terminal 40 and the information distribution server 10, and may provide the data of the selected quality for the information terminal 40.

A base station apparatus 30 is an apparatus which performs wired communication with the information distribution server 10 and which performs wireless communication such as mobile communication with each of the information terminals 40. The wireless communication between the base station apparatus 30 and the information terminal 40 may be performed by using various communication methods such as 3G and 4G mobile communications.

An information terminal 40 is a computer, such as a cellular phone (including a smartphone), a tablet terminal, and a personal computer, which is operated by a user. The information terminal 40 performs wireless communication with a base station apparatus 30, and performs data communication with the information distribution server 10 via the base station apparatus 30, thereby, for example, receiving data from the information distribution server 10. The information terminal 40 measures the communication bandwidth (BW) between the information distribution server 10 and the information terminal 40. The information terminal 40 receives/transmits packets from/to the information distribution server 10, measures the round trip time (RTT) and the packet loss ratio (p) of the received/transmitted packets, and calculates the communication bandwidth on the basis of the measured values and Expression (1) as described below. In Expression (1) described below, it is assumed that an information terminal communicates with the information distribution server 10 in a wired manner. Therefore, in the present embodiment, lost packets caused by congestion are extracted from packets which have been lost, and a packet loss ratio to be substituted into Expression (1) is calculated. The detail of a process of calculating a packet loss ratio will be described below.

[Math. 1]

$$BW \le C \cdot \frac{MSS}{RTT} \cdot \frac{1}{p^k} \quad (1)$$

2. Hardware Configuration Diagram

Figure 2:
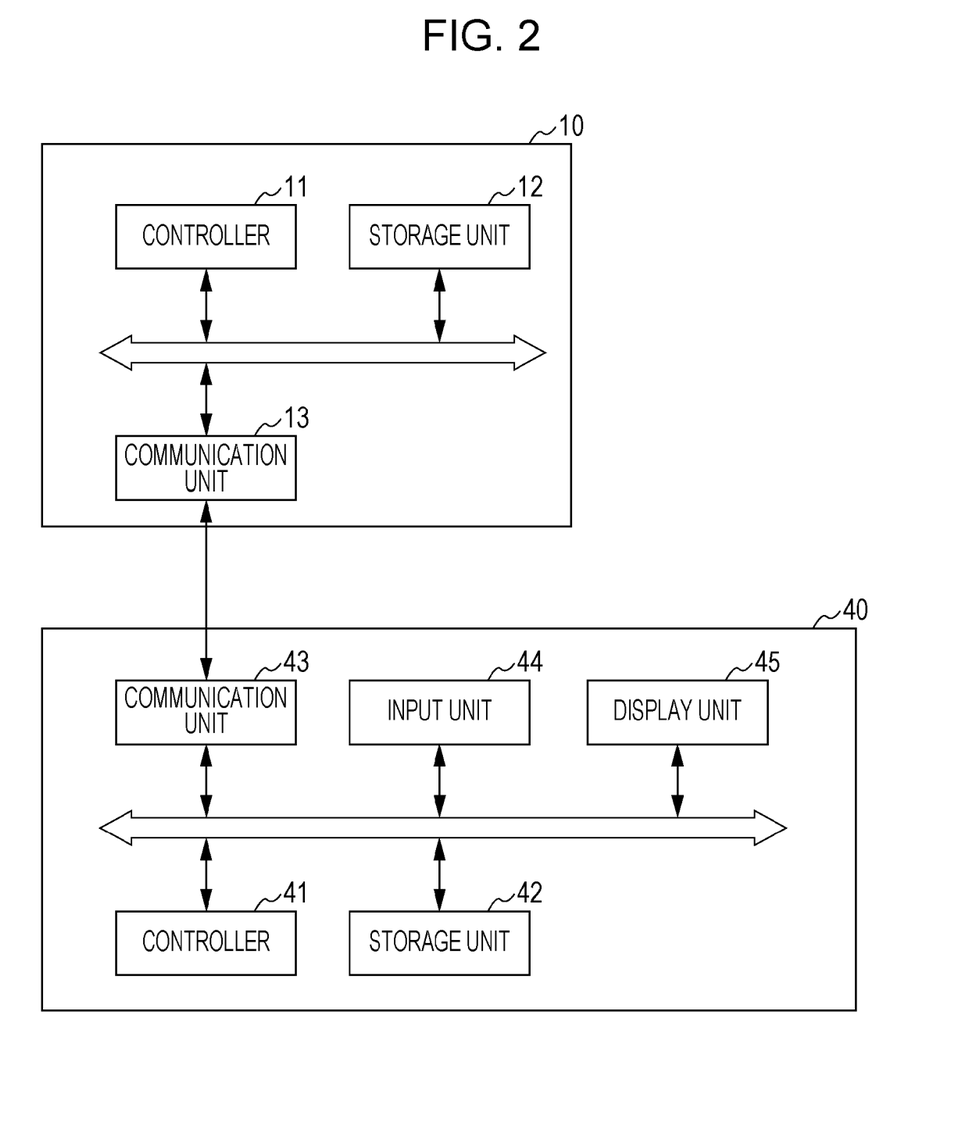
FIG. 2 is a diagram illustrating an exemplary hardware configuration provided for the information distribution server and that for an information terminal.

The hardware configuration provided for the information distribution server 10 and that for an information terminal 40 will be described with reference to FIG. 2.

2-1. Information Distribution Server 10

An exemplary hardware configuration of the information distribution server 10 will be described. As illustrated in FIG. 2, the information distribution server 10 includes a controller 11, a storage unit 12, and a communication unit 13.

The controller 11 which includes a CPU (Central Processing Unit) performs various types of arithmetic processing on the basis of programs stored in the storage unit 12, and controls units of the information distribution server 10.

The storage unit 12 stores control programs such as an operating system of the information distribution server 10 and data. In addition, the storage unit 12 is used as a work memory for the controller 11. The programs may be supplied to the information distribution server 10 by storing them in an information storage medium, such as an optical disk, a magnetic disk, a magnetic tape, a magneto-optical disk, or a flush memory, or may be supplied to the information distribution server 10 via data communication means such as the Internet.

The communication unit 13 implemented by using a network interface card performs data communication, for example, with a base station apparatus 30 via the network, and also performs data communication, for example, with an information terminal 40 via a base station apparatus 30.

2-2. Information Terminal 40

An exemplary hardware configuration of an information terminal 40 will be described. As illustrated in FIG. 2, the information terminal 40 includes a controller 41, a storage unit 42, a communication unit 43, an input unit 44, and a display unit 45.

The controller 41 which includes a CPU (Central Processing Unit) performs various types of arithmetic processing on the basis of programs stored in the storage unit 42, and controls units of the information terminal 40.

The storage unit 42 stores control programs such as an operating system of the information terminal 40 and data. In addition, the storage unit 42 is used as a work memory for the controller 41. The programs may be supplied to the information terminal 40 by storing them in an information storage medium, such as an optical disk, a magnetic disk, a magnetic tape, a magneto-optical disk, or a flush memory, or may be supplied to the information terminal 40 via a data communication network such as the Internet.

The communication unit 43 including, for example, a wireless communication antenna communicates with a base station apparatus 30 via the wireless communication antenna. The communication unit 43 may be provided with a network interface card for wired communication in addition to or instead of the wireless communication antenna, and may communicate with the information distribution server 10 by using the network interface card.

The input unit 44 implemented by using an input apparatus, such as a touch panel or a keyboard, receives an operation input from a user.

The display unit 45 implemented by using a display apparatus such as a liquid crystal display displays a result (screen) of information processing performed by the controller 41.

3. Sequence

The detail of a process of measuring a communication bandwidth which is performed when the information terminals 40 in the information distribution system 1 use wireless communication will be described with reference to the sequence chart and the flowcharts in FIGS. 3 to 5.

3-1. Process of Measuring Communication Bandwidth

Figure 3:
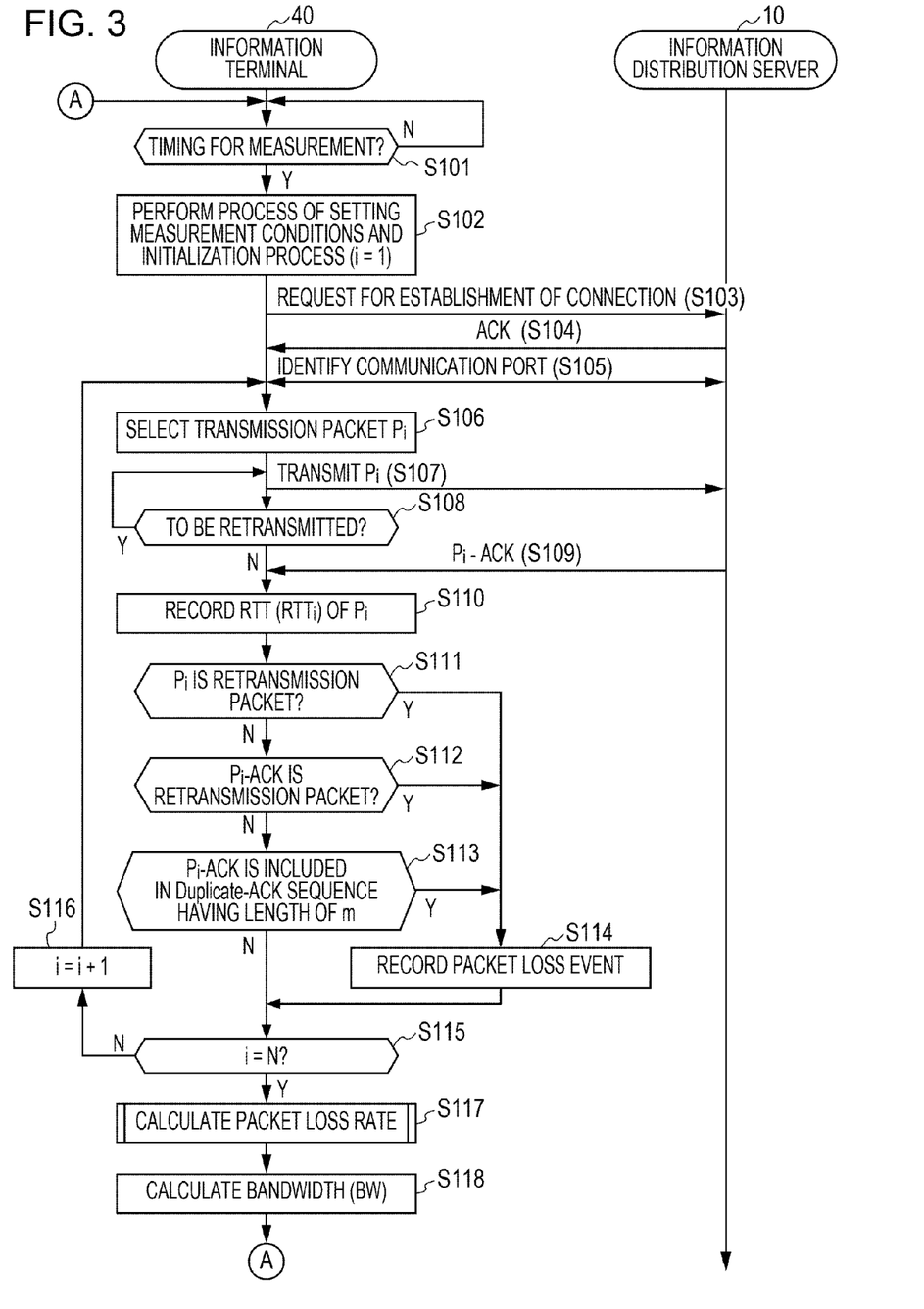
FIG. 3 is a sequence chart of a process of measuring a communication bandwidth.

FIG. 3 is a sequence chart of a process of measuring a communication bandwidth.

As illustrated in FIG. 3, if a timing for measuring a communication bandwidth hasn't come (S101: N), an information terminal 40 waits. If a timing for measuring a communication bandwidth has come (S101: Y), the information terminal 40 proceeds to S102, and starts a process of measuring a communication bandwidth. The process of measuring a communication bandwidth may be performed at predetermined time intervals, or may be performed at a timing at which a predetermined process occurs.

When the information terminal 40 starts the process of measuring a communication bandwidth, the information terminal 40 performs a process of setting measurement conditions and an initialization process (S102). The measurement conditions may include information about, for example, setting of a device (in this example, the information distribution server 10) which is a target in communication using a communication path to be measured, and the total transmission number (N) of packets for measuring a communication bandwidth. The total transmission number N of packets may be set as N=n·m where a unit measurement process in which a packet is transmitted n times is looped m times. In the initialization process, a variable i may be set to 1.

The information terminal 40 requests the information distribution server 10 to establish a connection (S103).

When a connection with the information terminal 40 is to be established, the information distribution server 10 transmits an acknowledgment (ACK) to the information terminal 40 (S104). When the information terminal 40 receives the acknowledgment (ACK) from the information distribution server 10, the information terminal 40 identifies information about the port which is used in communication with the information distribution server 10, and vice versa (S105).

The information terminal 40 selects a transmission packet $P_i$ to be transmitted to the information distribution server 10 (S106). For example, when mod(i, n) using the variable i is equal to 1, the information terminal 40 may transmit a SYN packet. When mod(i, n) is equal to 0, the information terminal 40 may transmit a FIN packet. When mod(i, n) is other than 0 or 1, the information terminal 40 may transmit a DATA packet.

The information terminal 40 transmits the transmission packet $P_i$ selected in S106 to the information distribution server 10 (S107). If retransmission is required (S108: Y), the information terminal 40 retransmits the transmission packet $P_i$. For example, when the information terminal 40 has not received an acknowledgment for the packet $P_i$ in a predetermined time, the information terminal 40 may retransmit the packet $P_i$.

When the information distribution server 10 receives the packet $P_i$ from the information terminal 40, the information distribution server 10 transmits an acknowledgment ($P_i$-ACK) for the packet $P_i$ to the information terminal 40 (S109). When $P_i$-ACK is required to be retransmitted, the information distribution server 10 may also retransmit $P_i$-ACK.

When the information terminal 40 receives the acknowledgment ($P_i$-ACK) for the packet $P_i$, the information terminal 40 records the round trip time ($RTT_i$) of the packet $P_i$ in the storage unit 42 (S110). The round trip time $RTT_i$ may be calculated as an elapsed time from the transmission time of the packet $P_i$ to the reception time of the acknowledgment ($P_i$-ACK) for the packet $P_i$.

If the packet $P_i$ is a retransmission packet (S111: Y), if the acknowledgment ($P_i$-ACK) for the packet $P_i$ is a retransmission packet (S112: Y), or if the acknowledgment ($P_i$-ACK) for the packet $P_i$ is an acknowledgement in a duplicate ACK acknowledgment (Duplicate-ACK) sequence having a length of k (for example, k=3) (S113: Y), the information terminal 40 records a packet loss event for the packet $P_i$ (S114). For example, in the case where initial values of $E_1$ to $E_N$ are set to 0 (no packet loss) where $E_i$ represents a data value of a packet loss event for the packet $P_i$, when a packet loss event for the packet $P_i$ is recorded, $E_i$ may be rewritten as $E_i=1$. Whether or not the packets ($P_i$, $P_i$-ACK) are retransmission packets may be determined by referring to the header information of the packets.

After S114, the information terminal 40 proceeds to S115, or if the following condition is satisfied, the information terminal 40 proceeds to S115 without recording a packet loss event. The condition is that the packet $P_i$ is not a retransmission packet (S111: N); the acknowledgment ($P_i$-ACK) for the packet $P_i$ is not a retransmission packet (S112: N); and the acknowledgment ($P_i$-ACK) for the packet $P_i$ is not an acknowledgement in a duplicate ACK acknowledgment (Duplicate-ACK) sequence having a length of k (for example, k=3) (S113: N).

If the variable i does not reach N (S115: N), the information terminal 40 increments the variable i (adds 1 to i) (S116), and returns back to S106. If the variable i reaches N (S115: Y), the information terminal 40 calculates a packet loss rate on the basis of the records of packet loss events for the packets $P_1$ to $P_N$ (S117). The detail of the process of calculating a packet loss rate will be described below.

The information terminal 40 substitutes the packet loss rate (p) calculated in S117, the maximum segment size (MSS) of a packet, the recorded RTT (which may be, for example, the average of $RTT_1$ to $RTT_N$) into Expression (1) described above, and calculates the bandwidth (BW) of the communication path between the information terminal 40 and the information distribution server 10 (S118). When the information terminal 40 calculates the bandwidth (BW), the information terminal 40 returns back to S101, and repeatedly performs the processes after that.

3-2(1). First Process of Calculating Packet Loss Rate

Referring to the flowchart illustrated in FIG. 4, the detail of a first process of calculating a packet loss rate which is performed in an information terminal 40 will be described.

Figure 4:
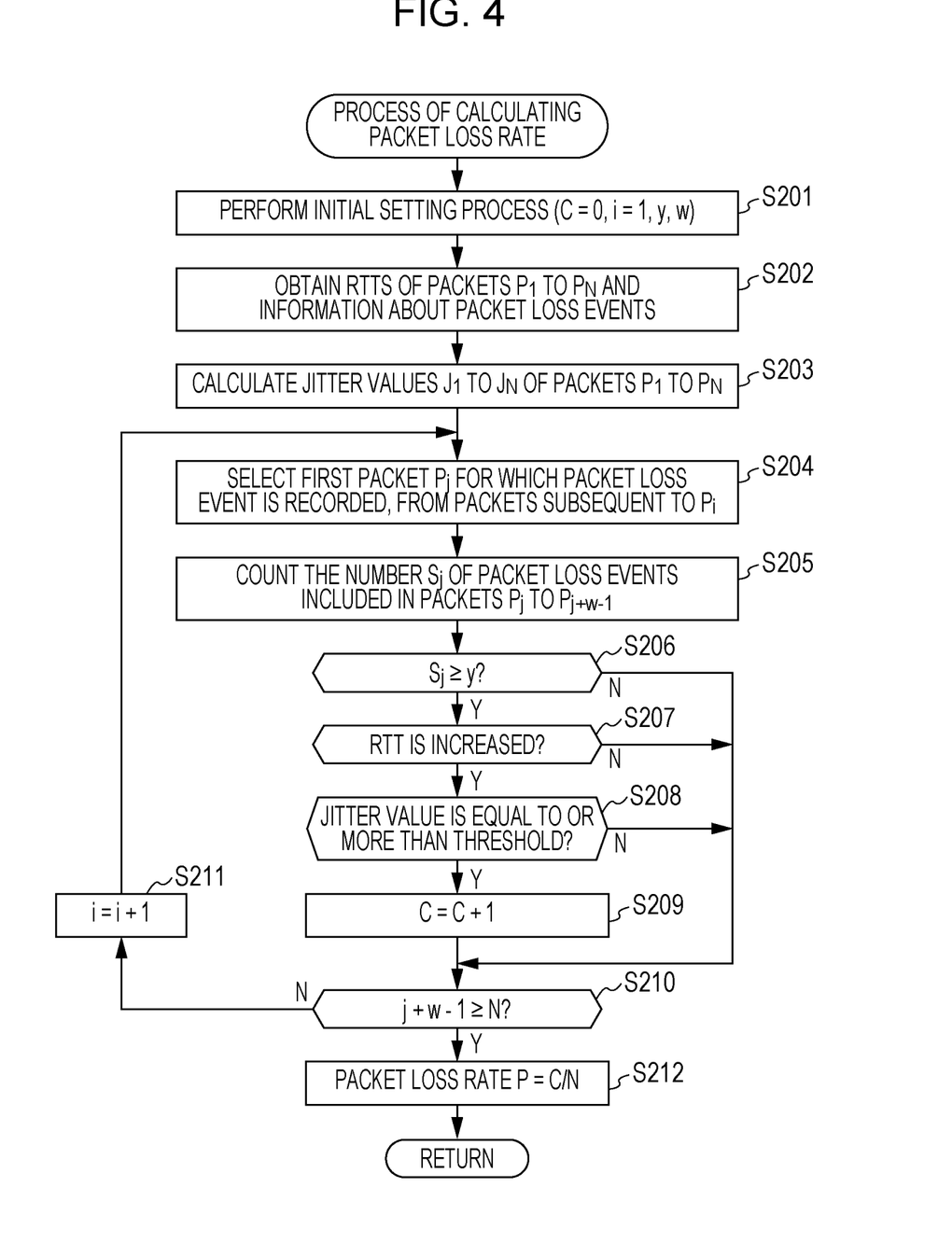
FIG. 4 is a flowchart of a first process of calculating a packet loss rate.

As illustrated in FIG. 4, the information terminal 40 performs an initial setting process for calculating a packet loss rate (S201). In the initial setting process, the packet loss counter C is set to 0, the variable i is set to 1, and a threshold y and a window size w are set. For example, the window size w may be set to any value equal to or more than the minimum value $w_0$ of the window size. The threshold y may be set to a larger value among $\alpha \cdot w$ and the minimum value $y_0$ of y. That is, an expression, $y=\max[\alpha \cdot w, y_0]$, may be used, where $0<\alpha<1$, and, for example, expressions, $w_0=3$, $y_0=3$, $\alpha=0.5$, and the like, may be used in the setting.

The information terminal 40 refers to the storage unit 42 to obtain RTTs ($RTT_1$ to $RTT_N$) of the respective packets $P_1$ to $P_N$ and the information about the packet loss events ($E_1$ to $E_N$) (S202). The information terminal 40 calculates the value of jitter $J_i$ of the packet $P_i$ on the basis of RTTs obtained for the packets $P_1$ to $P_N$ (S203). The jitter $J_i$ may be calculated by using an expression, $J_i=|RTT_{i+1}-RTT_i|$.

The information terminal 40 selects the first packet $P_j$ for which a packet loss event is recorded, from packets subsequent to $P_i$, i.e., $P_i$ to $P_N$ (S204). That is, $E_i$ to $E_N$ may be searched for the first event $E_j$ whose value is equal to 1, and $P_j$ corresponding to $E_j$ may be selected.

The information terminal 40 counts the number $S_j$ of packet loss events included in a packet sequence, $P_j$ to $P_{j+w-1}$, whose length is w and which starts with the packet $P_j$ (S205). For example, the information terminal 40 may calculate $S_j$ by using Expression (2) described below.

[Math. 2]

$$S_j = \sum_{s=j}^{j+w-1} E_s \quad (2)$$

If $S_j$ counted in S205 is equal to or more than the threshold y (S206: Y), the information terminal 40 determines whether or not the value of RTT is increased in packets $P_j$ to $P_{j+w-1}$ (S207). For example in S207, the information terminal 40 may determine whether or not the value of RTT is sequentially increased in packets for which packet loss events are recorded among the packets $P_j$ to $P_{j+w-1}$.

If it is determined that the value of RTT is increased in the packets $P_j$ to $P_{j+w-1}$ (S207: Y), the information terminal 40 determines whether or not the jitter values of the packets $P_j$ to $P_{j+w-1}$ are equal to or more than a threshold (S208). For example in S208, the information terminal 40 may determine whether or not each of the jitter values of packets for which packet loss events are recorded among the packets $P_j$ to $P_{j+w-1}$ is equal to or more than a threshold ($J_0$), that is, may determine whether or not an increase in RTT is equal to or more than the threshold.

If the conditions in S206, S207, and S208 are satisfied (S206: Y, S207: Y, S208: Y), the information terminal 40 increments the packet loss counter C (adds 1 to C) (S209).

After S209, or if either of the conditions in S206, S207, and S208 is not satisfied (S206: N, S207: N, or S208: N), the information terminal 40 proceeds to S210.

If (j+w−1) is less than N (S210: N), the information terminal 40 increments the variable i (adds 1 to i) (S211), and returns back to S204. If (j+w−1) is equal to or more than N (S210: Y), information terminal 40 calculates the packet loss rate p on the basis of the value of the packet loss counter C (S212), and returns. For example, the information terminal 40 may calculate the packet loss rate p by using an expression, p=C/N.

Figure 6:
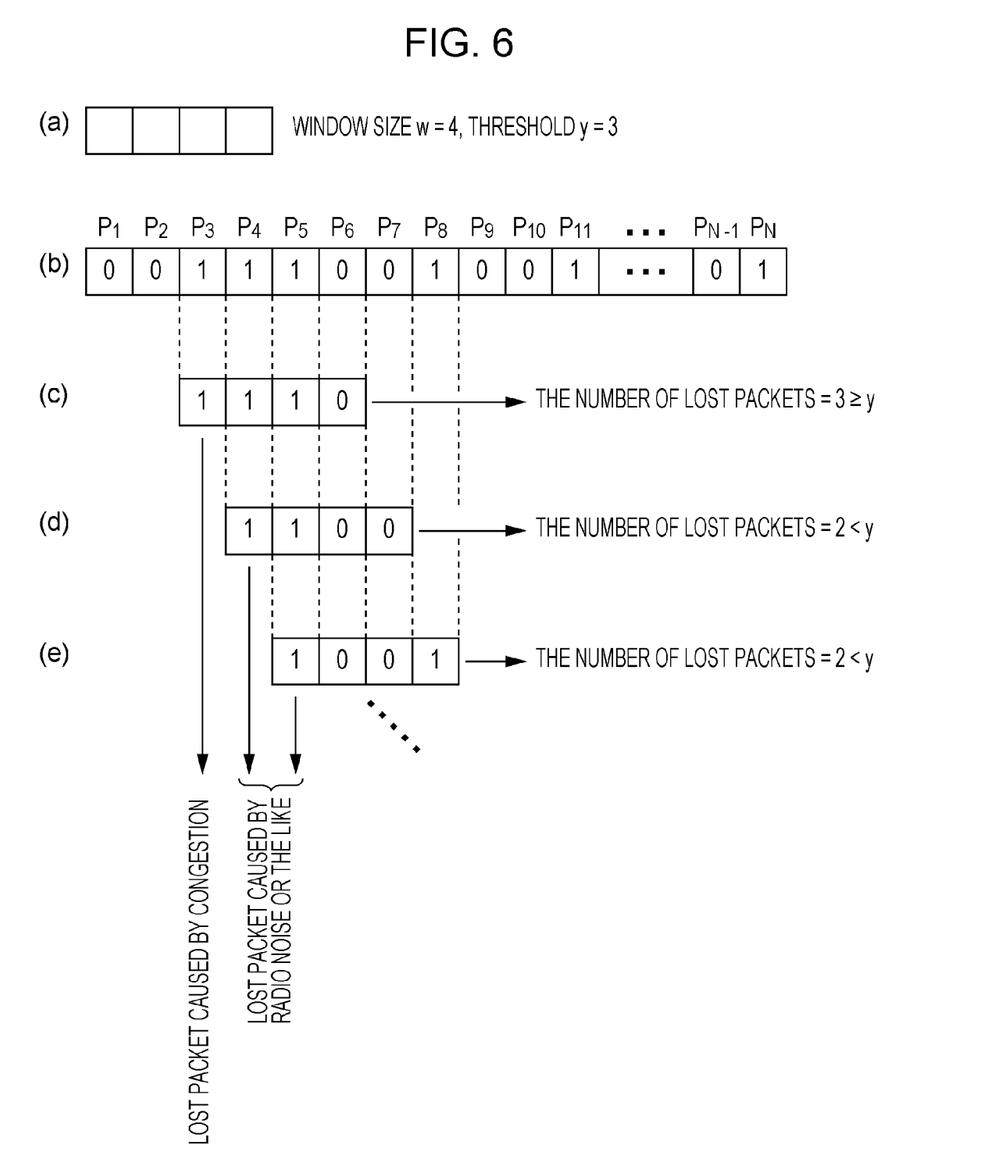
FIG. 6 includes diagrams (a) to (e) for describing a process of classifying lost packets in the first process of calculating a packet loss rate.

FIG. 6 includes diagrams (a) to (e) for describing a process of classifying recorded packet loss events into those caused by congestion and those caused by radio noise or the like, which is performed in the first process of calculating a packet loss rate.

(a) of FIG. 6 illustrates an exemplary window size. In the example illustrated in (a) of FIG. 6, the window size w is set to 4, and the threshold y is set to 3. For the sake of simplicity, in the example described below, it is assumed that, when the number of packet loss events included in the window is equal to or more than the threshold, a packet loss event is determined to be caused by congestion; and, otherwise, a packet loss event is determined to be caused by radio noise or the like.

(b) of FIG. 6 illustrates the values of the packet loss events $E_1$ to $E_N$ which are recorded for the packets $P_1$ to $P_N$. The value "0" indicates that no packet loss events are recorded, and the value "1" indicates that a packet loss event is recorded.

As illustrated in (c) of FIG. 6, the information terminal 40 moves the window to the first packet (in this example, $P_3$) for which a packet loss event is recorded among the packets $P_1$ to $P_N$, and counts the number of packet loss events in the window. In the example illustrated in (c) of FIG. 6, the number of packet loss events is 3, which is equal to or more than the threshold y. Therefore, it is determined that the packet loss event recorded for $P_3$ is caused by congestion.

As illustrated in (d) of FIG. 6, the information terminal 40 moves the window to the first packet (in this example, $P_4$) among packets for which packet loss events are recorded and which are packets subsequent to the top packet (in this example, $P_3$) in the window and, and counts the number of packet loss events in the window. In the example illustrated in (d) of FIG. 6, the number of packet loss events is 2, which is less than the threshold y. Therefore, the packet loss event recorded for $P_4$ is determined to be caused by radio noise or the like.

As illustrated in (e) of FIG. 6, the information terminal 40 moves the window to the first packet (in this example, $P_5$) among packets for which packet loss events are recorded and which are packets subsequent to the top packet (in this example, $P_4$) in the window, and counts the number of packet loss events in the window. In the example illustrated in (e) of FIG. 6, the number of packet loss events is 2, which is less than the threshold y. Therefore, it is determined that the packet loss event recorded for $P_5$ is caused by radio noise or the like. Thus, the information terminal 40 sequentially determines whether each of the packet loss events recorded for $P_1$ to $P_N$ is caused by congestion or by radio noise or the like.

3-2(2). Second Process of Calculating Packet Loss Rate

Referring to the flowchart illustrated in FIG. 5, the detail of a second process of calculating a packet loss rate which is performed in an information terminal 40 will be described. The second process of calculating a packet loss rate is different from the first process of calculating a packet loss rate described above in that the window size is changeable and that the processing speed is improved.

Figure 5:
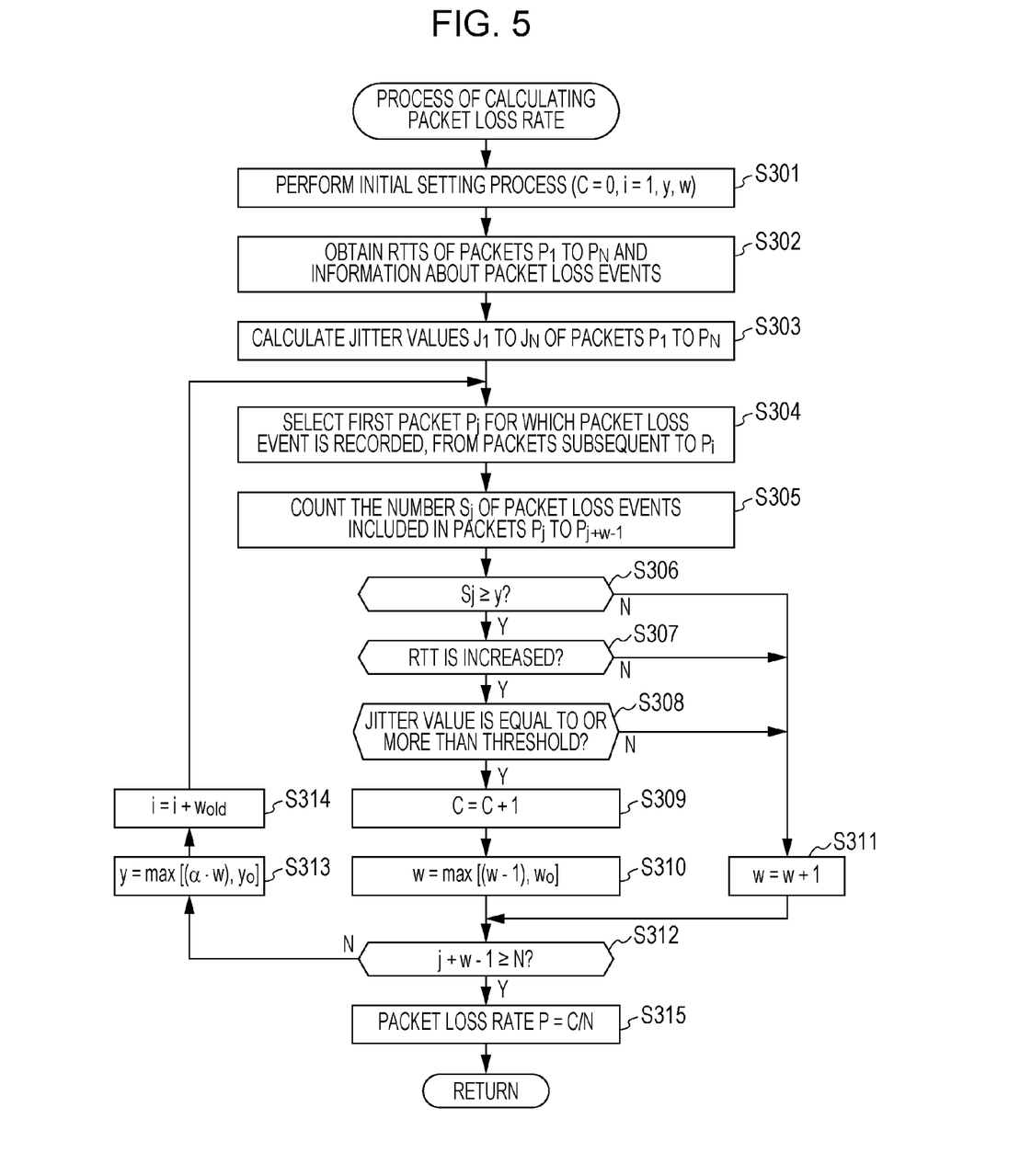
FIG. 5 is a flowchart of a second process of calculating a packet loss rate.

As illustrated in FIG. 5, the information terminal 40 performs an initial setting process for calculating a packet loss rate (S301). In the initial setting process, the packet loss counter C is set to 0, the variable i is set to 1, and the threshold y and the window size w are set to initial values. For example, the initial value of the window size may be set to any value equal to or more than the minimum value $w_0$ of the window size. The initial value of threshold y may be set to a larger value among α·w and the minimum value $y_0$ of y. That is, an expression, y=max[α·w, $y_0$], may be used, where 0<α<1, and, for example, expressions, $w_0$=3, $y_0$=3, α=0.5, and the like, may be used in the setting.

The information terminal 40 refers to the storage unit 42 to obtain RTTs ($RTT_1$ to $RTT_N$) of the respective packets $P_1$ to $P_N$ and the information about the packet loss events ($E_1$ to $E_N$) (S302). The information terminal 40 calculates the value of jitter $J_i$ of the packet $P_i$ on the basis of RTTs obtained for the packets $P_1$ to $P_N$ (S303). The jitter $J_i$ may be calculated by using an expression, $J_i=|RTT_{i+1}-RTT_i|$.

The information terminal 40 selects the first packet $P_j$ for which a packet loss event is recorded, from packets subsequent to $P_i$, i.e., $P_i$ to $P_N$ (S304). That is, $E_i$ to $E_N$ may be searched for the first event $E_j$ whose value is equal to 1, and $P_j$ corresponding to $E_j$ may be selected.

The information terminal 40 counts the number $S_j$ of packet loss events included in w sequential packets $P_j$ to $P_{j+w-1}$ from the packet $P_j$ (S305). For example, the information terminal 40 may calculate $S_j$ by using Expression (2) described below.

[Math. 3]

$$S_j = \sum_{s=j}^{j+w-1} E_s \quad (2)$$

If $S_j$ counted in S305 is equal to or more than the threshold y (S306: Y), the information terminal 40 determines whether or not the value of RTT is increased in packets $P_j$ to $P_{j+w-1}$ (S307). For example in S307, the information terminal 40 may determine whether or not the value of RTT is sequentially increased in packets for which packet loss events are recorded among the packets $P_j$ to $P_{j+w-1}$.

If it is determined that the value of RTT is increased in the packets $P_j$ to $P_{j+w-1}$ (S307: Y), the information terminal 40 determines whether or not the jitter values of the packets $P_j$ to $P_{j+w-1}$ are equal to or more than a threshold (S308). For example in S308, the information terminal 40 may determine whether or not each of the jitter values of packets for which packet loss events are recorded among the packets $P_j$ to $P_{j+w-1}$ is equal to or more than a threshold ($J_0$), that is, may determine whether or not an increase in RTT is equal to or more than the threshold.

If the conditions in S306, S307, and S308 are satisfied (S306: Y, S307: Y, S308: Y), the information terminal 40 increments the packet loss counter C (adds 1 to C) (S309), and updates the window size w with a larger value among (w−1) and the minimum value $w_0$ of w (S310).

If either of the conditions S306, S307, and S308 is not satisfied (S306: N, S307: N, or S308: N), the information terminal 40 adds 1 (or an integer larger than 1) to the window size w, and enlarges the window size (S311).

After S310 or S311, if (j+w−1) is less than N (S312: N), the information terminal 40 updates the threshold y with a larger value among α·w and the minimum value $y_0$ of y (S313), adds the window size $w_{old}$ which is a value before the update in S310 or S311, to the variable i (S314), and returns back to S304. If (j+w−1) is equal to or more than N (S312: Y), the information terminal 40 calculates the packet loss rate p on the basis of the value of the packet loss counter C (S315), and returns. For example, the information terminal 40 may calculate the packet loss rate p by using an expression, p=C/N.

Figure 7:
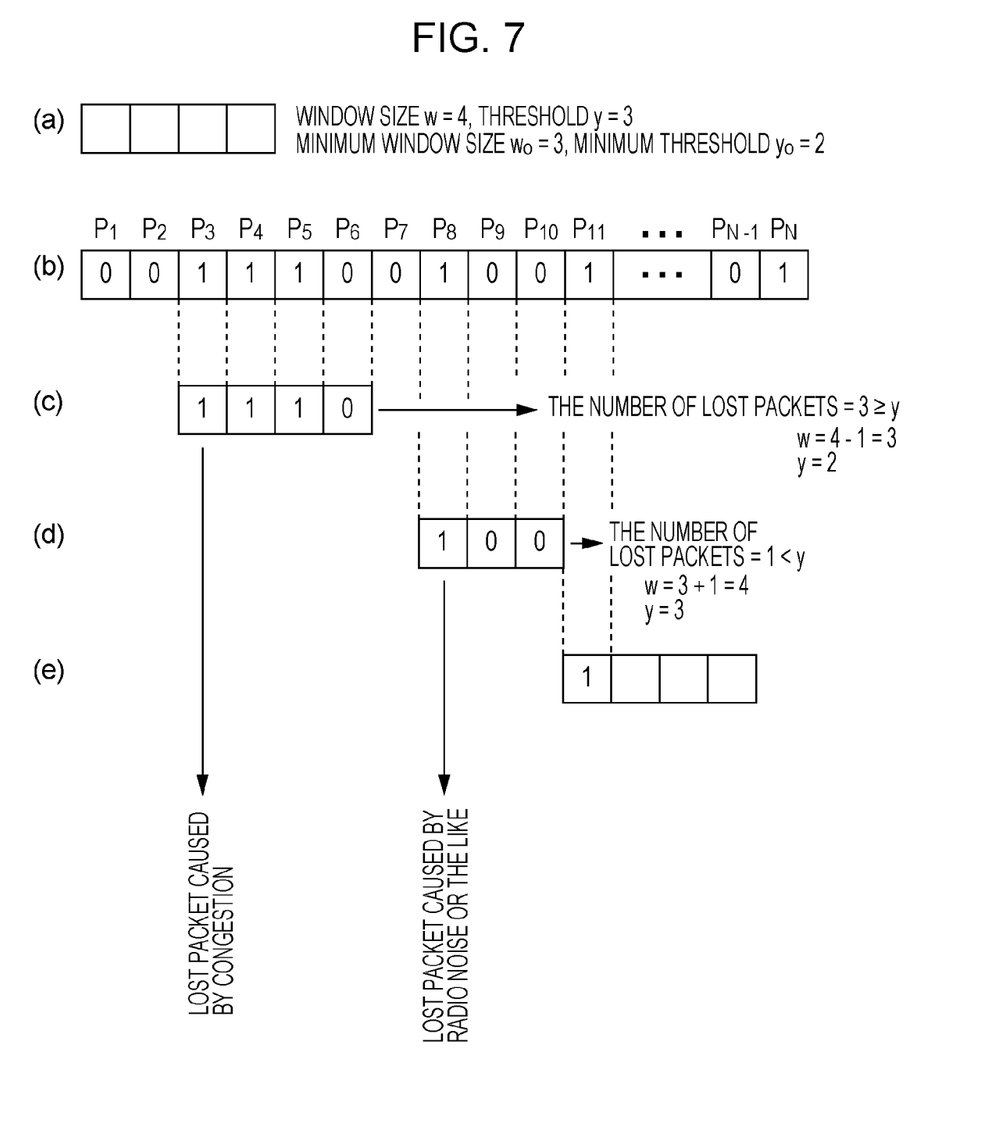
FIG. 7 includes diagrams (a) to (e) for describing a process of classifying lost packets in the second process of calculating a packet loss rate.

FIG. 7 includes diagrams (a) to (e) for describing a process of classifying recorded packet loss events into those caused by congestion and those caused by radio noise or the like, which is performed in the second process of calculating a packet loss rate.

(a) of FIG. 7 illustrates an exemplary window size. In the example illustrated in (a) of FIG. 7, the initial value of the window size w is set to 4, the minimum value $w_0$ of w is set to 3, the initial value of the threshold y is set to 3, and the minimum value $y_0$ is set to 2. For the sake of simplicity, in the example described below, it is assumed that, when the number of packet loss events included in the window is equal to or more than the threshold, a packet loss event is determined to be caused by congestion; and, otherwise, a packet loss event is determined to be caused by radio noise or the like.

(b) of FIG. 7 illustrates the values of packet loss events $E_1$ to $E_N$ which are recorded for the packets $P_1$ to $P_N$. The value "0" indicates that no packet loss events are recorded, and the value "1" indicates that a packet loss event is recorded.

As illustrated in (c) of FIG. 7, the information terminal 40 moves the window to the first packet (in this example, $P_3$) for which a packet loss event is recorded among the packets $P_1$ to $P_N$, and counts the number of packet loss events in the window. In the example illustrated in (c) of FIG. 7, the number of packet loss events is 3, which is equal to or more than the threshold y. Therefore, it is determined that the packet loss event recorded for $P_3$ is caused by congestion. Congestion is likely to continue. Therefore, the window size is reduced (w=4−1=3), and the threshold y is updated in accordance with the reduced window size (y=2).

As illustrated in (d) FIG. 7, the information terminal 40 moves the window to the first packet (in this example, $P_8$) among packets which have not been included in the window and for which packet loss events are recorded, and counts the number of packet loss events in the window. In the example illustrated in (d) of FIG. 7, the number of packet loss events is 1, which is less than the threshold y. Therefore, the packet loss event recorded for $P_8$ is determined to be caused by radio noise or the like. The window size is enlarged (w=3+1=4), and the threshold y is also updated in accordance with the enlarged window size (y=3).

As illustrated in (e) of FIG. 7, the information terminal 40 moves the window to the first packet (in this example, $P_{11}$) among packets which have not been included in the window and for which packet loss events are recorded, and counts the number of packet loss events in the window. Thus, the information terminal 40 is capable of counting the number of packet loss events caused by congestion among the packet loss events recorded for $P_1$ to $P_N$.

4. Modified Embodiments

The present invention is not limited to the embodiment described above. For example, the information terminal 40 may switch the process: when wireless communication is performed, the information terminal 40 calculates a packet loss rate according to the flows illustrated in FIGS. 4 and 5; and, when wired communication is performed, the information terminal 40 uses the total number of packet loss events recorded in S114 in FIG. 3 without conversion to calculate a packet loss rate. That is, when wired communication is performed, the information terminal 40 may calculate a packet loss rate by using Expression (3) described below.

[Math. 4]

$$p = \sum_{i=1}^{N} E_i / N \qquad (3)$$

In the embodiment described above, the example in which a bandwidth is calculated on the basis of the rate of occurrence of lost packets caused by congestion is described. Alternatively, a bandwidth may be calculated by using an expression for calculating a bandwidth on the basis of the rate of occurrence of lost packets caused by radio noise or the like.

In the embodiment described above, the example in which an information terminal 40 measures the bandwidth is described. Alternatively, the information distribution server 10 may measure the bandwidth.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication-information measuring device comprising:
   a transmitting unit that sequentially transmits one or more packets to a communication target apparatus;
   a receiving unit that receives acknowledgments for the transmitted packets from the communication target apparatus;
   a recording unit that records a round trip time and occurrence of packet loss for each of the transmitted packets on the basis of the transmitted packet and the acknowledgment for the transmitted packet;
   a counting unit that counts the number of packet sequences among one or more packet sequences, each of the one or more packet sequences having a plurality of continuous packets including one or more packets at the top, each of the one or more packets being a packet for which packet loss is recorded by the recording unit among the transmitted packets, each of the packet sequences being such that the number of packet losses included in the packet sequence and an increase state of the round trip time for packets included in the packet sequence satisfy respective predetermined conditions; and a calculating unit that calculates a packet loss ratio on the basis of the number counted by the counting unit and the number of transmitted packets.

2. The communication-information measuring device according to claim 1,
wherein the recording unit records occurrence of packet loss if either of conditions is satisfied, the conditions being that a packet having been transmitted by the transmitting unit is retransmitted, that the acknowledgment received by the receiving unit is a retransmitted acknowledgment, and that a sequence of acknowledgments of a predetermined type is present among the acknowledgments received by the receiving unit, the sequence having a predetermined length.

3. The communication-information measuring device according to claim 1, further comprising:
a determining unit which determines whether or not a condition is satisfied, the condition being that the number of packet losses included in each of the packet sequences is equal to or more than a first threshold, that the round trip time for packets included in the packet sequence is sequentially increased, and that an increase in the round trip time for each of the packets included in the packet sequence is equal to or more than a second threshold,
wherein the counting unit counts the number of packet sequences determined to be packet sequences satisfying the condition by the determining unit, among the one or more packet sequences.

4. The communication-information measuring device according to claim 3, further comprising:
a selecting unit that sequentially selects a packet sequence by sequentially selecting a packet from the top of a sequence of packets for which packet loss is recorded by the recording unit among the transmitted packets, the sequentially selected packet sequence having a plurality of continuous packets in which the selected packet is present at the top,
wherein the determining unit sequentially determines whether or not the sequentially selected packet sequence satisfies the condition.

5. The communication-information measuring device according to claim 3, further comprising:
a selecting unit that sequentially selects a packet sequence by sequentially selecting a packet from the top of a sequence of unprocessed packets for which packet loss is recorded by the recording unit among the transmitted packets, the sequentially selected packet sequence including packets, the number of which is equal to a window size and in which the selected packet is present at the top, the window size being two or more,
wherein the determining unit determines whether or not the sequentially selected packet sequence satisfies the condition, and
when the determining unit determines that the condition is satisfied, the window size is decreased, and, when the determining unit determines that the condition is not satisfied, the window size is increased.

6. The communication-information measuring device according to claim 5, further comprising:
an updating unit that, when the window size is changed, updates the first threshold with a larger value among the window size and a predetermined minimum value.

7. The communication-information measuring device according to claim 1,
wherein, when wireless communication is performed, the calculating unit calculates a packet loss ratio on the basis of the number counted by the counting unit and the number of transmitted packets, and
when wired communication is performed, the calculating unit calculates a packet loss ratio on the basis of the number of packets for which packet loss is recorded by the recording unit among the transmitted packets and the number of transmitted packets.

8. A non-transitory computer readable medium storing a program causing a computer to function as:
a transmitting unit that sequentially transmits one or more packets to a communication target apparatus;
a receiving unit that receives acknowledgments for the transmitted packets from the communication target apparatus;
a recording unit that records a round trip time and occurrence of packet loss for each of the transmitted packets on the basis of the transmitted packet and the acknowledgment for the transmitted packet;
a counting unit that counts the number of packet sequences among one or more packet sequences, each of the one or more packet sequences having a plurality of continuous packets including one or more packets at the top, each of the one or more packets being a packet for which packet loss is recorded by the recording unit among the transmitted packets, each of the packet sequences being such that the number of packet losses included in the packet sequence and an increase state of the round trip time for packets included in the packet sequence satisfy respective predetermined conditions; and
a calculating unit that calculates a packet loss ratio on the basis of the number counted by the counting unit and the number of transmitted packets.

* * * * *